Feb. 11, 1969  R. E. DAWSON  3,427,610
VEHICULAR SIGNAL LENS HAVING CONCENTRIC ANNULAR RINGS
Filed June 16, 1967
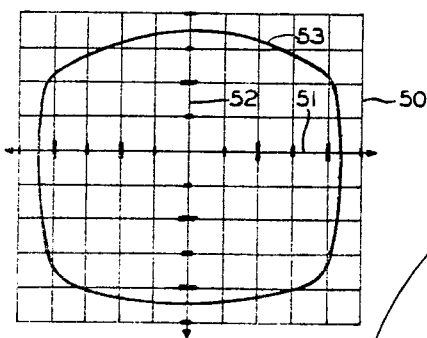
Fig.11
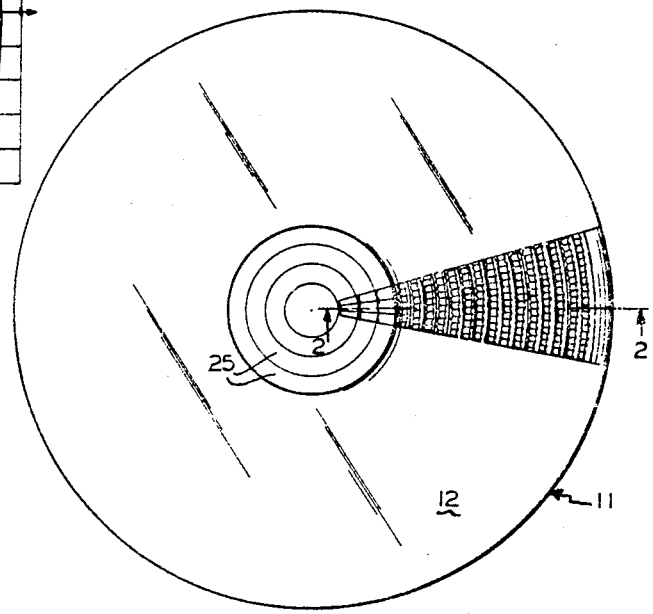
Fig. 1
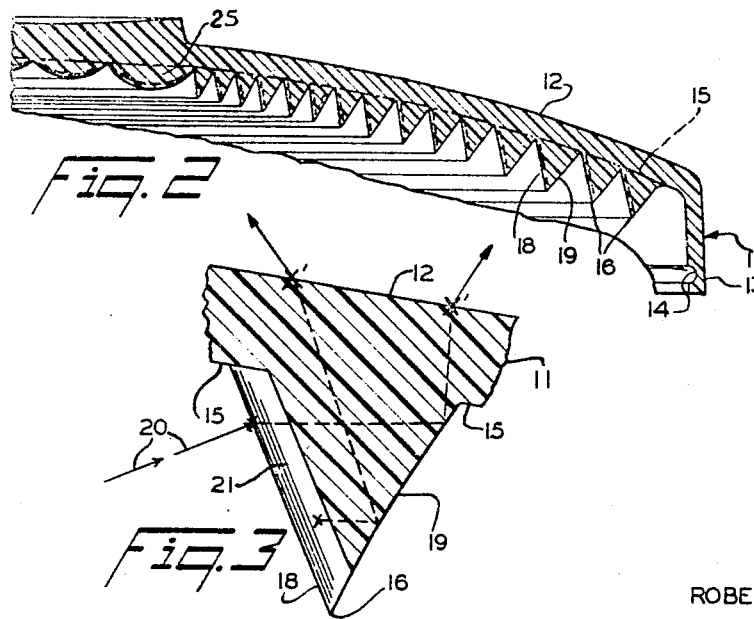
Fig.2
Fig.3
INVENTOR
ROBERT E. DAWSON
BY Bruns and Jenney
Atty's Feb. 11, 1969 R. E. DAWSON 3,427,610
VEHICULAR SIGNAL LENS HAVING CONCENTRIC ANNULAR RINGS
Filed June 16, 1967 Sheet 2 of 2

INVENTOR.
ROBERT E. DAWSON
BY Bruns and Jenney
Att'ys.

United States Patent Office 3,427,610
Patented Feb. 11, 1969

3,427,610
VEHICULAR SIGNAL LENS HAVING CONCENTRIC ANNULAR RINGS
Robert E. Dawson, Huntingdon Valley, Pa., assignor to R. E. Dietz Company, a corporation of New York
Filed June 16, 1967, Ser. No. 646,583
U.S. Cl. 340—383　　　　　　　　　　　　　6 Claims
Int. Cl. B60q 1/34

---

ABSTRACT OF THE DISCLOSURE

A vehicular signal lens for a turn signal or stop light having a smooth, easily cleaned outer surface and a generally parallel inner base surface having thereon a plurality of concentric annular catadioptric rings. Each ring projects from the inner base surface and is generally cross-sectionally triangular, each having a light receiving and a light reflecting surface. One surface of each catadioptric ring is fluted, having a plurality of convex, like, contiguous curvatures of predetermined radius for spreading the apparent source of light from the lens along the catadioptric rings. The lens also has a bulls-eye of similarly fluted refraction type rings at the center.

---

Cross-reference to related application

The invention is an improvement on application Ser. No. 414,103, filed Nov. 27, 1964, by the same inventor.

Background of the invention

This invention relates to vehicular lamp lenses and more particularly to such lenses having catadioptric rings each ring having opposed light receiving and light reflecting surfaces.

In order to minimize the ring effect or spoke effect in such lenses it has heretofore been the practice to sandblast or liquid-hone the die surfaces which form the molded lens ring surfaces, as described in Patent 2,831,394, to Heenan et al., dated Apr. 22, 1958. This results in irregular cone-shaped protrusions on the ring surfaces of the lens which scatter the light, but haphazardly and in a manner which cannot be controlled.

Application Ser. No. 414,103, referred to above, suggests the forming of lenticular elements of predetermined curvature on the lens front surface for similar reasons. For automotive lenses, however, this has the disadvantage of an exposed lens surface which is difficult to clean.

Summary of the invention

According to the present invention, it is proposed to form the lenticular elements on one or more of the surfaces of the projecting rings on the inner surface of the lens. The lenticular elements have a known or predetermined radius of curvature, either cylindrical or spherical, and may be oriented in the lens system in a predetermined direction and angular position. This may be done by grinding concave depressions in the die surface forming the molded lens ring surface.

The principal object of the invention, accordingly, is to obtain an apparent source of light, in ring-type lenses, along the ring completely around the lens when viewed from anywhere in a predetermined area in front of the lens.

Another important object is to obtain the controlled spread of light along catadioptric ringed lenses by fluting one surface of each ring with a plurality of convex, like, contiguous curvatures having a predetermined radius.

Other objects and advantages will become apparent from the following description in conjunction with the appended drawings, in which:

Brief description of the drawings

FIGURE 1 is a plan view of the front surface of a lens according to the invention, a sector showing the configuration of the back surface as viewed from the front;

FIGURE 2 is an enlarged fragmentary sectional view on the line 2—2 of FIGURE 1;

FIGURE 3 is a further enlarged fragmentary sectional view of one ring of FIGURE 2;

FIGURE 11, on the first sheet of drawings, is a diagrammatic representation of the area in front of the lens illuminated by light from a single lenticular element.

Description of the preferred embodiments

Figure 4:
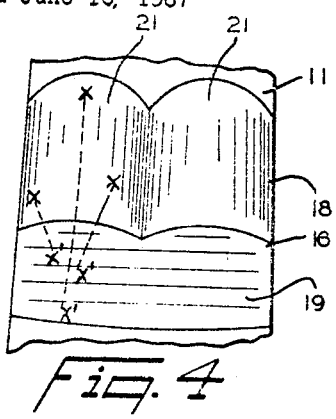
FIGURE 4 is an enlarged fragmentary perspective view of one ring of FIGURE 2 as viewed from the rear.
Figure 5:
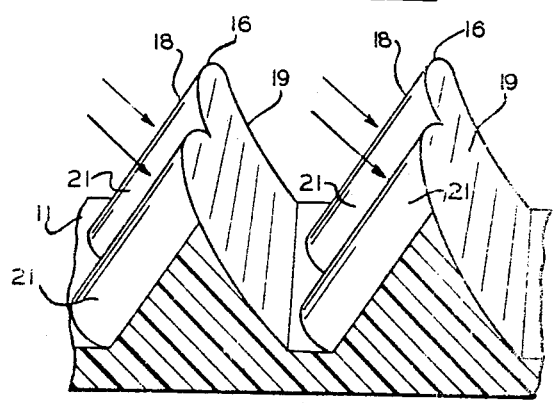
FIGURE 5 is an enlarged, fragmentary perspective view, partly in section, of two adjacent rings of the lens of FIGURE 2.

Referring to FIGURES 1–5 inclusive, a dished lens 11 has a smooth, spherically curved front surface 12 and a perimetrical flange portion 13 having a groove 14 therein adapted to be snapped into engagement with a cooperating bead on the light base.

The inner base surface 15 is generally parallel to the front surface and has a plurality of concentric catadioptric rings 16 projecting rearward therefrom. Each ring 16 is generally triangular in cross-section, having a light receiving and refracting surface 18 facing toward the lamp bulb, or light source, not shown, and an opposed light reflecting surface 19 for reflecting light toward the front surface 12. As indicated by the broken lines and arrows in FIGURE 3, light from the source, indicated by the arrows 20, strikes the surface 18, is refracted thereby, as indicated by the broken lines, strikes the reflecting surface 19, is reflected thereby, and emerges from the front surface 12, being again there refracted. The points of refraction are indicated in the drawing by $x$ and $x'$.

The tooth-shaped ring 16 shown in FIGURE 3 has its light-reflecting surface or face curved concavely from apex to root, as shown, for spreading the rays of light radially of the lens as indicated. The novelty, however, is in the light-receiving surface 18 which is straight from apex to root but fluted, as shown, in the other direction along the ring. Two adjacent convolutions of the fluting are shown in FIGURE 4, forming like, contiguous lenticular elements 21 protruding from surface 18 and each having the same cylindrical radius as the other.

It will be understood that the rounded protuberances or lenticular elements 21 may be formed by grinding inversely conformed concavities or grooves on the tubular, telescopically arranged elements of the male die which are described in Patent 2,831,394 and shown in FIGURES 13 and 14 thereof. The cylindrically curved grooves are ground in the surface of the beveled edge of the die element end which forms the surface 18 of each particular lens ring 16, the cylindrical axis of each groove being parallel to the surface 18 before grinding and the grooves extending from the apex end to the base end of the die surface forming the ring surface.

It will be apparent that light striking the surface 18 at each lenticular element 21 will be given a different direction upon being refracted at the surface 18 according to the location $x$, indicated in FIGURE 4, at which it is received and refracted on the lenticular element 21. After being reflected at different points on the reflecting surface 19 and being refracted again at $x'$ at the front surface 12 of the lens, light following the paths indicated by the broken lines $x$–$x'$ will eventually take divergent paths in front of lens 11.

Since a viewer standing in front of lens 11 will see the apparent source of light which emerges from the lens in his direction as a glow on the front surface 12 at a point in front of the ring 16, the effect of the lenticular elements 21 is to render the light falling on one element 21 viewable from more viewing points in front of the lens. The light from each element 21 is spread in the circular direction in which the ring 16 extends. Each ring 16 is fluted so that the net result is that, as viewed from the predetermined area in front of the lens, more area of the front surface 12 appears to glow when viewed from any particular point in that area in front of the lens.

Furthermore, since each surface 18 and surface 19 may have a predetermined angular relation to the axis of lens 11 and since the lenticular elements 21 may have a predetermined radius of curvature, it is possible to control the light emitted by each lenticular element so that it is visible from an increased area in front of the lens and the intensity of light viewed at each viewing point is controlled by the choice of angles and radii. The result in that, when viewed from this area, the lens appears to glow all along the lens surface 12 in front of the rings 16.

It will be noted in FIGURES 1 and 2 that the lens 11 has a bulls-eye area at its center at which the rear surface bears concentric refraction type rings 25. Each ring 25 has a light receiving and refracting surface toward the rear of the lens and another light refracting surface on the front surface of the lens. The rear surface of rings 25 may be fluted, as shown, similarly to the rings 16 so as to also spread the light in the circular direction in which the rings 25 extend.

Figure 6:
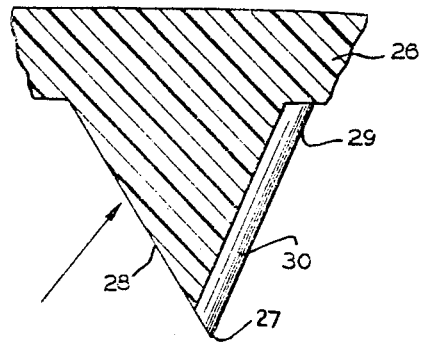
FIGURE 6 is an enlarged fragmentary sectional view, similar to FIGURE 3, of a modified form of lens according to the invention.
Figure 7:
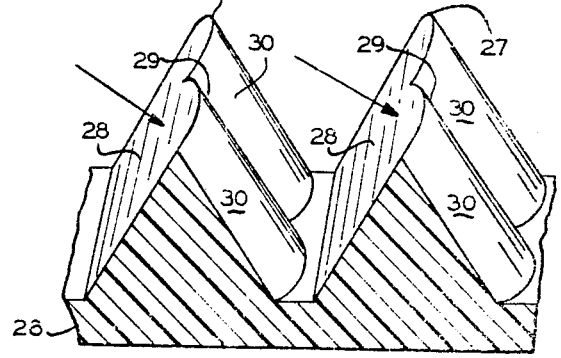
FIGURE 7 is an enlarged fragmentary perspective view, partly in section, of two adjacent rings of the lens of FIGURE 6.

In FIGURES 6 and 7, portions of a modified lens 26 are shown. Lens 26 has a plurality of concentric catadioptric rings 27 similar to lens 11 except that their light receiving surface 28 is smooth and flat from apex to base and their light reflecting surfaces 29 are fluted. The flutings, or lenticular elements 30, also have a predetermined cylindrical radius in the direction in which the rings 27 extend, the dispositon of the elements 30 on surface 29 being similar to the elements 21 on surface 18 of lens 11.

It will be apparent that the lenticular elements 30 will give different direction to light falling on the surface 28 of each ring at different points when the light is reflected from the surface 29. The result is also to spread the light from each ring in the direction in which the ring 27 extends.

Figure 8:
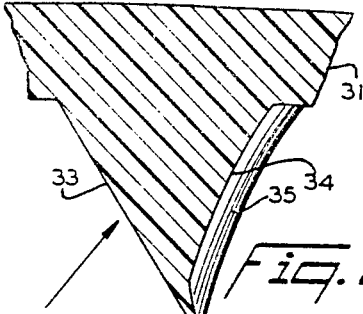
FIGURE 8 is an enlarged fragmentary sectional view, similar to FIGURE 3, of another modified form of lens.
Figure 9:
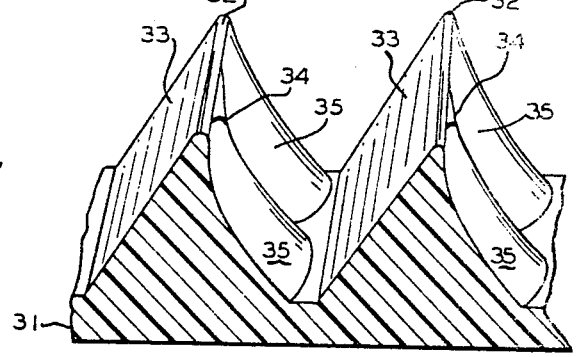
FIGURE 9 is an enlarged fragmentary perspective view, partly in section, of two adjacent rings of the lens of FIGURE 8.

In FIGURES 8 and 9, portions of another lens 31 are shown. Lens 31 also has a plurality of concentric catadioptric rings 32. Each ring 32 has a smooth light receiving surface 33 and a fluted light reflecting surface 34. The fluted surface 34, however, is concavely curved from apex to root and the flutes or lenticular elements 35 do not extend all the way up to the apex of the ring 32. It will be understood that this partially fluted surface may be obtained by bringing the grinding tool, in a direction corresponding to vertically downward in FIGURE 9, axially of the die element and grinding the beveled edge of the die element below the apex of the edge on a curve to give the curved configuration to the lenticular elements 35.

It will be apparent that, since the reflecting surface 34 of each ring 32 is curved in two directions, the light from each lenticular element 35 is spread in two directions. The curve from apex to root spreads the light radially of the lens and the curve of each flute or element spreads the light in the circular direction in which the ring 32 extends.

Figure 10:
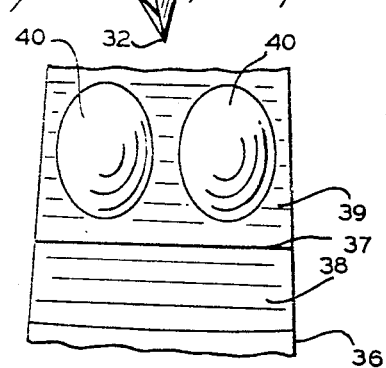
FIGURE 10 is an enlarged fragmentary perspective view of one ring, as viewed from the rear, of still another modified form of lens.

In FIGURE 10 still another modified lens 36 has a plurality of concentric catadioptric rings 37 each of which has a light receiving surface 38 and a light reflecting surface 39. On the light reflecting surface, raised or convex protuberances 40 are carried. Each lenticular element or protuberance 40 has a spherical radius and is formed by grinding a spherical hollow or depression in the beveled edge of the die which forms the surface 39 of the lens. Due to the circular configuration of the die beveled edge the depression, and hence the lenticular element 40, is elliptical in outline.

It will be apparent that the lenticular elements 40 are also curved in two directions, like elements 35 in the lens 31, and spread the light from each element in two directions, although in a conical manner.

Referring again to the lens 11 shown in FIGURES 1–5, a study of the light from a single lenticular element 21 is shown in FIGURE 11 on the first sheet of drawings. A screen 50 is shown placed in front of the lens 11 at a known distance in front of the lens. The screen is marked off in units of length by the horizontal line 51 and vertical line 52. The light from a single lenticular element 21 falls on the area outlined by the curved line 53. It will be noted that the area within line 53 is more rectangular than circular.

This is to be expected because the light emerging from the front surface 12, as spread by the curved reflecting surface 19 as shown in FIGURE 3, is divergent in a direction radial of the lens. The emerging light, as spread by the lenticular element 21 as shown in FIGURE 4, is convergent up to a point in front of the lens where the converging rays of light cross over and become divergent in a direction normal to that radial of the lens.

The area illuminated by each lenticular element 21 may be controlled by proper choice of the angular relation of surfaces 18 and 19 to the source of light, the spherical curvature of the front surface 12, the curvature of surface 19, and the cylindrical radius of element 21. This will suggest to those skilled in the art that the catadioptric rings 16 need not be circular, as is usually the case when lenticular elements of conical or spherical configuration are employed, but may be concentric ellipses, squares or rectangles, if desired. It is not the intention, accordingly, to limit the conformation of the catadioptric elements to circular by the use of the word "rings" but it is to be understood that "rings" includes such other concentric conformations as elliptical, square and rectangular.

As will be apparent to those familiar with the art, the invention may be embodied in other specific forms without departing from the spirit or essential characteristics thereof. The embodiments disclosed therefore are to be considered in all respects as illustrative, rather than restrictive, the scope of the invention being indicated by the appended claims.

What is claimed is:

1. A vehicular signal lens having front and rear base surfaces, a plurality of concentric, light directing, rings projecting from the rear base surface, each ring having opposed light receiving and light reflecting surfaces, one of said ring opposed surfaces having lenticular elements thereon for spreading the apparent source of light therefrom circularly along said rings, each element having a predetermined curvature in the direction the ring extends.

2. The vehicular signal lens defined in claim 1 characterized by the surface of each of said lenticular elements being cylindrical in configuration.

3. The vehicular signal lens defined in claim 1 characterized by the surface of each of said lenticular elements being spherical in configuration.

4. A vehicular signal lens having a smooth front surface and a generally parallel rear base surface, the rear base surface having a plurality of concentric catadioptric rings projecting therefrom, each ring having a light receiving and refracting surface and a light reflecting surface; the improvement comprising: one of said catadioptric ring surfaces being fluted in the direction the ring extends; the fluting being a plurality of convex, like, contiguous, predetermined curvatures of the ring surface.

5. The vehicular signal lens defined in claim 4 characterized by the fluting curvatures being on the light receiving ring surfaces.

6. The vehicular signal lens defined in claim 4 characterized by the fluting curvatures being on the light reflecting ring surfaces.

References Cited

UNITED STATES PATENTS 1,274,054   8/1918   Johanson _____ 340—383

JOHN W. CALDWELL, *Primary Examiner.*

HAROLD PITTS, *Assistant Examiner.*

U.S. Cl. X.R.

340—103